US012313020B2

(12) United States Patent
Zapf et al.

(10) Patent No.: US 12,313,020 B2
(45) Date of Patent: May 27, 2025

(54) LIQUID-COOLED INTERNAL COMBUSTION ENGINE

(71) Applicant: AVL LIST GMBH, Graz (AT)

(72) Inventors: Martin Zapf, Au Bei Turnau (AT); Jürgen Gelter, Graz (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 18/282,166

(22) PCT Filed: Mar. 15, 2022

(86) PCT No.: PCT/AT2022/060075
§ 371 (c)(1),
(2) Date: Sep. 14, 2023

(87) PCT Pub. No.: WO2022/192930
PCT Pub. Date: Sep. 22, 2022

(65) Prior Publication Data

US 2024/0151192 A1 May 9, 2024

(30) Foreign Application Priority Data

Mar. 15, 2021 (AT) .............................. A 50181/2021

(51) Int. Cl.
*F02F 1/40* (2006.01)
*F01P 3/02* (2006.01)
(Continued)

(52) U.S. Cl.
CPC .................. *F02F 1/40* (2013.01); *F02F 1/14* (2013.01); *F02F 1/16* (2013.01); *F01P 2003/028* (2013.01); *F02F 2001/104* (2013.01)

(58) Field of Classification Search
CPC ........ F02F 1/40; F02F 1/14; F02F 1/16; F02F 2001/104; F01P 2003/028; F01P 3/02
See application file for complete search history.

(56) References Cited

U.S. PATENT DOCUMENTS 1,177,162 A * 3/1916 Zona .......................... F02F 1/14 123/41.67
4,305,348 A * 12/1981 Martin .................. F16J 15/022 123/41.82 R (Continued)

FOREIGN PATENT DOCUMENTS

AT 005039 U1 2/2002
AT 501008 A2 5/2006

(Continued)

*Primary Examiner* — Kurt Philip Liethen
(74) *Attorney, Agent, or Firm* — Dykema Gossett PLLC

(57) ABSTRACT

The invention relates to a liquid-cooled internal combustion engine, comprising:—a cylinder head having a top-down cooling concept, with a head cooling chamber with a first head partial cooling chamber spaced apart from the fire deck and with a second head partial cooling chamber, which adjoins the fire deck of the cylinder head and is separated from the first head partial cooling chamber by an intermediate deck, the first head partial cooling chamber and the second head partial cooling chamber being fluidically interconnected, in the region of a central component, by means of a passage channel in the intermediate deck;—a main feed channel, which is disposed in the cylinder block and is connected to the first head partial cooling chamber by means of a first flow passage in the fire deck of the cylinder head and by means of a supply channel;—a block cooling jacket, which is fluidically connected to the second head partial cooling chamber by means of a second flow passage in the fire deck of the cylinder head. According to the invention, in order to improve the cooling, the block cooling jacket has a first block partial cooling jacket, which is near the fire deck and into which the second flow passage leads, and a second block partial cooling jacket, which is separated from the first block partial cooling jacket and is remote from the fire deck, the first block cooling jacket being fluidically connected to the second block cooling jacket by means of a third flow (Continued)

passage which is diametrically opposite the second flow passage, and the second block partial cooling jacket being connected to a main discharge channel which is disposed in the cylinder block.

23 Claims, 2 Drawing Sheets

(51) Int. Cl.

| | |
|---|---|
| ***F02F 1/10*** | (2006.01) |
| ***F02F 1/14*** | (2006.01) |
| ***F02F 1/16*** | (2006.01) |

(56) References Cited

U.S. PATENT DOCUMENTS

| | | | | |
|---|---|---|---|---|
| 8,662,028 | B2 * | 3/2014 | Knollmayr | F02F 1/40<br>123/41.82 R |
| 10,385,800 | B2 * | 8/2019 | Hyde | F01P 3/16 |
| 2010/0132639 | A1 * | 6/2010 | Poschl | F02F 1/242<br>123/41.82 R |
| 2011/0277708 | A1 * | 11/2011 | Geiser | F02F 1/40<br>123/41.82 R |
| 2015/0211408 | A1 * | 7/2015 | Maier | F02F 1/38<br>123/41.82 R |
| 2019/0301394 | A1 * | 10/2019 | Knollmayr | F01P 3/02 |
| 2020/0318525 | A1 * | 10/2020 | Palmisani | F02F 1/16 |

FOREIGN PATENT DOCUMENTS

| | | | |
|---|---|---|---|
| AT | 503182 | A2 | 8/2007 |
| AT | 515143 | B1 | 11/2015 |
| EP | 3379063 | A1 | 9/2018 |
| KR | 20160098599 | A | 8/2016 |

* cited by examiner

LIQUID-COOLED INTERNAL COMBUSTION ENGINE

CROSS-REFERENCE TO RELATED APPLICATION

This application is a national stage filing based upon International application No. PCT/AT2022/060075, filed 15 Mar. 2022, which claims the benefit of priority to Austria application No. A50181/2021, filed 15 Mar. 2021.

BRIEF SUMMARY

The invention relates to a liquid-cooled internal combustion engine, in particular a large engine, having an inlet side and an exhaust side which are arranged on different sides of a longitudinal engine plane defined by a cylinder axis and a crankshaft axis, with a cylinder head having a top-down cooling concept with a fire deck adjoining a cylinder block and a head cooling chamber with a first head partial cooling chamber spaced apart from the fire deck and with a second head partial cooling chamber which adjoins the fire deck of the cylinder head and is separated from the first head partial cooling chamber by an intermediate deck, wherein the first head partial cooling chamber and the second head partial cooling chamber are flow-connected to one another at least in the region of a central component by means of at least one transfer duct in the intermediate deck, having a main feed channel which is arranged in the cylinder block and is connected to the first head partial cooling chamber via a first flow transfer in the fire deck of the cylinder head and a supply channel, having at least one block cooling jacket which is flow-connected to the second head partial cooling chamber via at least one second flow transfer in the fire deck of the cylinder head.

The invention also relates to a method for cooling such an internal combustion engine.

BACKGROUND

AT 515 143 B1 and AT 503 182 A2 each describe a liquid-cooled internal combustion engine having a cylinder head and a cylinder block, wherein the cylinder head has two partial cooling chambers arranged one above the other, through which flow takes place according to a so-called top-down cooling concept. The two partial cooling chambers are separated from one another by an intermediate deck and are flow-connected to one another in the region of a centrally arranged injector sleeve via at least one transfer duct. The coolant is supplied via an inlet channel in the cylinder block, flows through a cooling chamber surrounding the cylinder in the cylinder block and is supplied directly to the upper partial cooling chamber of the cylinder head via flow transfers in the fire deck and supply channels. As a result, the coolant flows through the cylinder head from top to bottom, as it were, first being supplied to the upper partial cooling chamber and, after flowing through the upper partial cooling chamber, flowing via the at least one transfer duct into the lower partial cooling chamber, where the coolant is guided radially from the inside to the outside via radial cooling ducts in the region of the valve bridges and finally leaves the cylinder head again via laterally arranged discharge channels.

AT 005 039 U1 describes a cylinder block for a liquid-cooled internal combustion engine having a distributor duct and a collecting duct for a coolant, wherein the distributor duct is arranged above the collecting duct in the region of a side wall of the cylinder block and the distributor duct is flow-connected to a first cooling chamber via a feed duct. A cylinder head connection surface of the cylinder block has, for each cylinder, at least one overflow opening leading from the first cooling chamber via an overflow channel to the cylinder head and at least one discharge opening leading to the collector duct for coolant from the cylinder head, wherein the overflow opening and the discharge opening are arranged on different sides of a longitudinal engine plane. The first cooling chamber is flow-connected to a second cooling chamber adjoining it in the direction of the crankcase around the cylinder liner, which is connected to the distributor duct via at least one transfer opening.

AT 501 008 A2 discloses a liquid-cooled internal combustion engine having a cooling jacket around the cylinders in the crankcase, having individual cylinder heads with at least two cooling chambers arranged one above the other in the cylinder head, wherein the cooling jacket of the crankcase and the lower cooling chamber in the cylinder head are connected to one another via four transfer openings per cylinder distributed uniformly around the circumference of the cylinder. An inlet distribution chamber and a return collection chamber for the coolant are arranged along one crankcase side wall. The inlet distribution chamber is connected to the cooling jacket of the crankcase via at least one connecting duct per cylinder, wherein each connecting duct opens radially into the cooling jacket. The return collection chamber is connected to the lower cooling chamber of the cylinder head.

Sufficient heat dissipation from thermally highly stressed areas is of great relevance, especially for large engines with high power, but is not always guaranteed with solutions known from the prior art.

It is therefore an object of the invention to enable the best possible and uniform cooling of thermally highly stressed areas in an internal combustion engine of the type mentioned at the outset with little manufacturing effort.

SUMMARY OF THE INVENTION

Starting from an internal combustion engine of the type mentioned at the beginning, this is achieved according to the invention in that the block cooling jacket has a first block partial cooling jacket which faces the fire deck and into which the second flow transfer opens, and a second block partial cooling jacket separated from the first block partial cooling jacket and arranged on a side of the first block partial cooling jacket facing away from the fire deck, wherein the first block cooling jacket is flow-connected to the second block cooling jacket by means of at least one third flow transfer in the cylinder block which is arranged diametrically opposite the second flow transfer with respect to the cylinder axis, and wherein the second block partial cooling jacket is connected to a main discharge channel arranged in the cylinder block.

Due to the fact that the third flow transfer is arranged diametrically opposite the second flow transfer, the first block cooling jacket is flowed through between two diametrically opposite longitudinal sides of the cylinder. In particular, in one embodiment variant of the invention in which the first block partial cooling jacket surrounds the cylinder liner predominantly—i.e. by a wrap angle of more than 180°—and preferably completely, a comprehensive flow around the cylinder liner and effective heat dissipation from an upper region of the cylinder facing the cylinder head is achieved.

Preferably, the third flow transfer and the second flow transfer are arranged on different sides of the longitudinal engine plane. This allows flow around the cylinder liner transversely to the longitudinal engine plane. In particular, it can be provided that the third flow transfer is arranged on the inlet side.

One embodiment of the invention provides for the first flow transfer—in relation to the longitudinal engine plane—to be arranged on the same side as the main feed channel, preferably—as seen in the direction of the cylinder axis—above the main feed channel. The coolant thus flows directly into the first head space of the cylinder head via the shortest possible path.

In particular, it can be provided in this case that the main feed channel—as viewed in the direction of the cylinder axis—can be arranged between the main discharge channel and a cylinder head sealing plane. This allows a compact arrangement. Particularly good heat dissipation can be achieved if the main discharge channel is arranged adjacent to the main feed channel on the exhaust side in the cylinder block.

Preferably, the first flow transfer is arranged on the same side as the second flow transfer—in relation to the longitudinal engine plane. Thus, the inflow of coolant into the first head partial cooling chamber and the outflow of coolant from the second head partial cooling chamber of the cylinder head occur on the same side of the longitudinal engine plane, namely on the exhaust side.

For optimum and uniform cooling of the cylinder liner, it is advantageous if the two block partial cooling chambers are arranged one above the other with respect to the cylinder axis, wherein the first block partial cooling jacket is arranged between the second block partial cooling jacket and the cylinder head sealing plane. It is advantageous in this case if the first block partial cooling jacket and/or the second block partial cooling jacket surround(s) the cylinder liner at least predominantly, preferably completely.

In order to ensure adequate heat dissipation from the thermally highly stressed regions of the valve bridges, one embodiment variant of the invention provides that the lower second head partial cooling chamber has an inner ring section around the central component and an outer ring section—as viewed in the direction of the cylinder axis—in the region of the cylinder liner, with the inner ring section and the outer ring section being flow-connected to one another via at least one radial channel in the region of an exhaust valve bridge and/or in the region of an inlet/exhaust valve bridge.

Particularly good cooling of the central component can be achieved if at least one transfer duct in the intermediate deck annularly surrounds the central component.

The internal combustion engine can be designed as self-igniting or spark-igniting, preferably with an active or passive pre-chamber—i.e. with a so-called PCSI cylinder head (PCSI=pre-chamber spark ignition).

According to one embodiment of the invention, the cylinder head is designed as a single cylinder head. In principle, however, there is nothing to prevent the invention from being used with multi-cylinder heads.

The described object is furthermore solved by the above-mentioned method for cooling an internal combustion engine according to the invention in that the coolant is supplied to a main feed channel in the cylinder block on the exhaust side of the internal combustion engine, is guided therefrom via a first flow transfer and a supply channel into the first head partial cooling chamber, flowing around the exhaust channels and cooling these in the process, and is then guided via at least one transfer duct in the region of the central component into the inner ring section of the second head partial cooling chamber, is guided therefrom via at least one radial channel in the region of an exhaust valve bridge and/or exhaust/inlet valve bridge into an outer ring section, is guided therefrom via the at least one second flow transfer arranged on the exhaust side into the first block partial cooling jacket, the coolant is guided from the exhaust side to the inlet side while flowing around an upper region of the cylinder liner facing the fire deck, is guided into the second block partial cooling jacket via a third flow transfer on the inlet side and, while flowing around a lower region of the cylinder liner facing away from the fire deck, is guided to a main discharge channel arranged on the exhaust side of the cylinder block According to one embodiment of the invention, it is provided that the coolant is guided through the head cooling chamber and the block cooling jacket between the inflow into the first head partial cooling chamber and the outflow through the main discharge channel in at least four passes extending transversely to the longitudinal direction of the engine, with at least two passes—in particular in the cylinder block—preferably intersecting the longitudinal engine plane. The cylinder head and the cylinder block are thus each flowed through in two passes aligned transversely to the longitudinal engine plane and thus optimally cooled. A pass is defined here as a substantially continuous heat transfer surface between two 180° detours of the flow path through the head and block cooling chambers.

BRIEF DESCRIPTION OF THE DRAWINGS

The invention is explained in more detail below with reference to the non-limiting exemplary embodiment shown in the figures, which schematically show.

DETAILED DESCRIPTION

Figure 1:
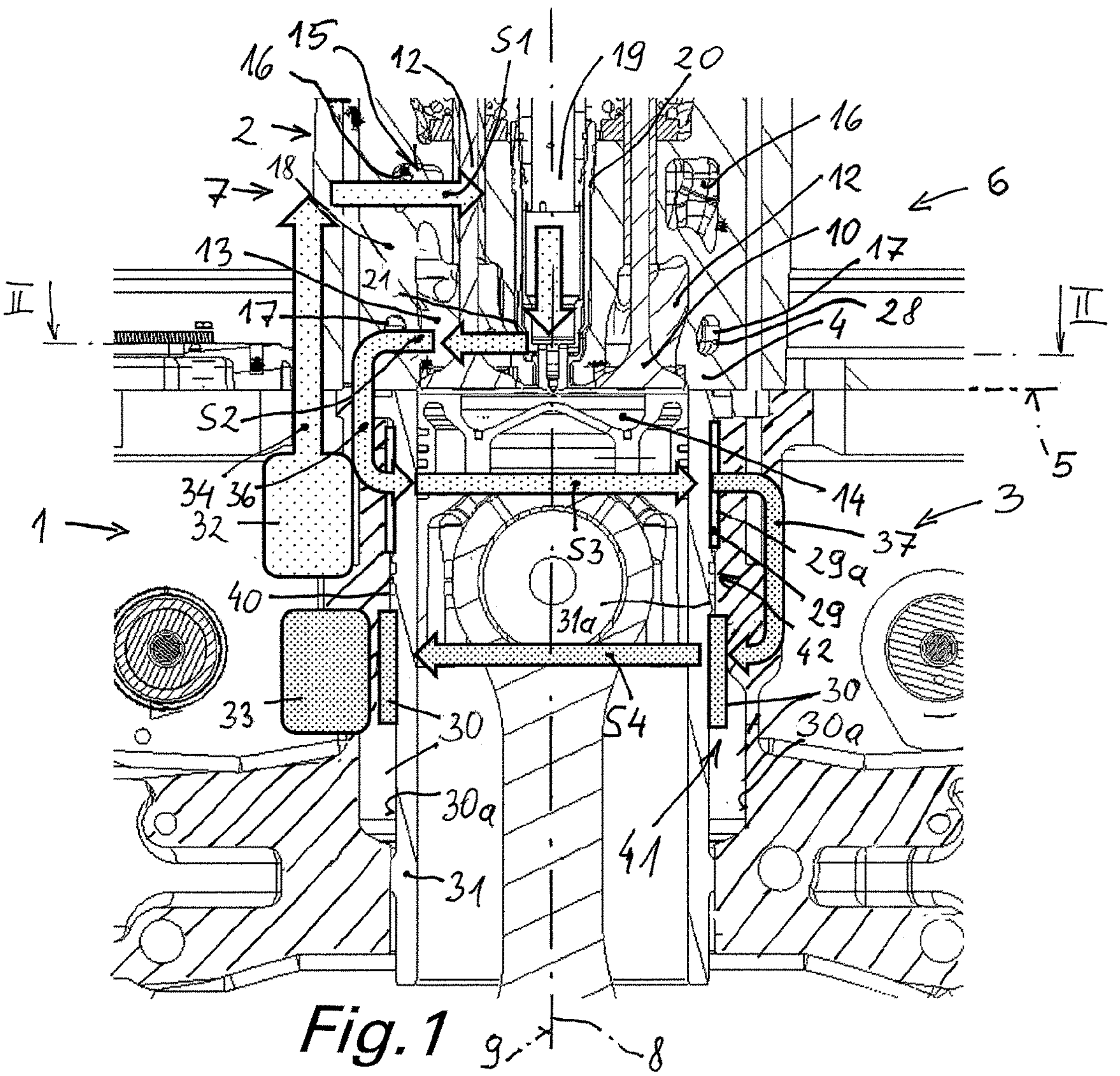
FIG. 1 shows a longitudinal section of an internal combustion engine according to the invention as shown by line I-I in FIG. 2.

FIG. 1 schematically shows a liquid-cooled internal combustion engine 1 according to the invention in longitudinal section normal to a crankshaft axis not shown further. The internal combustion engine 1, for example a large engine, can be self-igniting or spark-igniting—for example with PCSI (PCSI=pre-chamber spark ignition).

Figure 3:
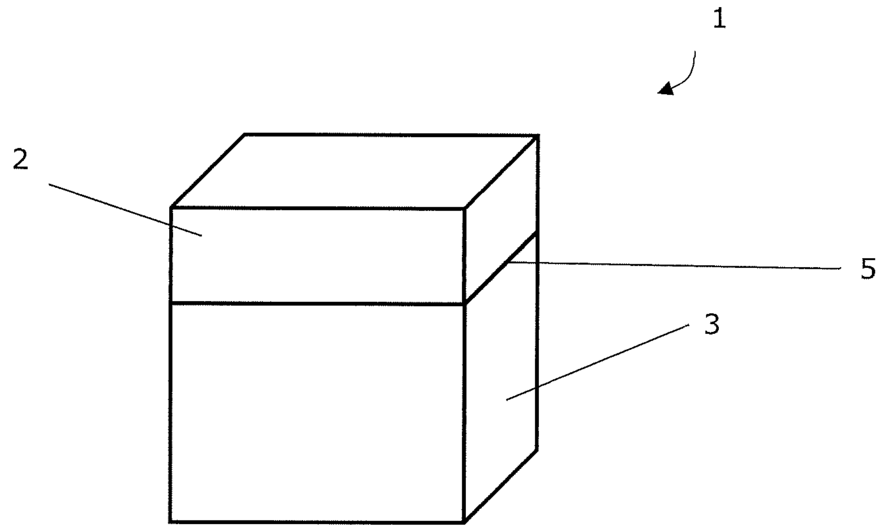
FIG. 3 shows a schematic representation of the internal combustion engine according to the invention.

The internal combustion engine 1 has a cylinder head 2—for example a single cylinder head—and a cylinder block 3, which are connected to one another in the region of a fire deck 4 of the cylinder head 2. FIG. 3 shows a schematic representation of an internal combustion engine 1 according to the invention designed as a single cylinder with a cylinder head 2 and a cylinder block 3.

Reference sign 5 indicates a cylinder head sealing plane between cylinder head 2 and cylinder block 3. The inlet side 6 and the exhaust side 7 of the internal combustion engine 1 are arranged on different sides of a longitudinal engine plane 9 defined by the crankshaft, which is not shown further, and the cylinder axis 8.

The cylinder head 2, which is designed as a single cylinder head, for example, has two inlet valves 10 and two exhaust valves 11, with inlet channels 12 being flowconnectable to the combustion chamber 14 via the inlet valves 10 and exhaust channels 13 via the exhaust valves 11. However, the cylinder head 2 can also be designed as a multi-cylinder head.

FIG. 1 shows the cooling chambers and flow paths of the coolant in the cylinder head 2 and in the cylinder block 1, in part schematically. A so-called top-down cooling concept is used. In the context of the present disclosure, such a concept is understood to mean in particular that a coolant flow in the cylinder head 2 is directed in the direction of the cylinder block 3 or the fire deck 4. In other words, coolant is guided in a direction along the cylinder axis 8 from an area remote from the fire deck 4 or the cylinder block 3 to the fire deck 4 or to the cylinder block 3, whereby in particular a high cooling effect can be achieved at the fire deck 4 which is subject to high thermal loads.

The cylinder head 2 having the top-down cooling concept has a head cooling chamber 15 with an upper first head partial cooling chamber 16 and a lower second head partial cooling chamber 17, which are separated from each other by an intermediate deck 18. The upper first head partial cooling chamber 16 is thus further away from the cylinder block 3 than the lower second head partial cooling chamber 17, as viewed in a direction along the cylinder axis 8. The upper first head partial cooling chamber 16 and the lower second head partial cooling chamber 17 are flow-connected to one another in the region of a central component 19, which in the exemplary embodiment is arranged in a receiving sleeve 20 arranged in the cylinder head 2, via at least one transfer duct 21 in the intermediate deck 18. The term central is to be understood here in particular with respect to the cylinder axis 8, so that a central component 19 is arranged as close as possible to or in the cylinder axis 8. The component 19 can be formed—in particular in the case of a diesel internal combustion engine—by a fuel injection device or—in the case of a gasoline internal combustion engine—by a pre-chamber ignition unit.

Figure 2:
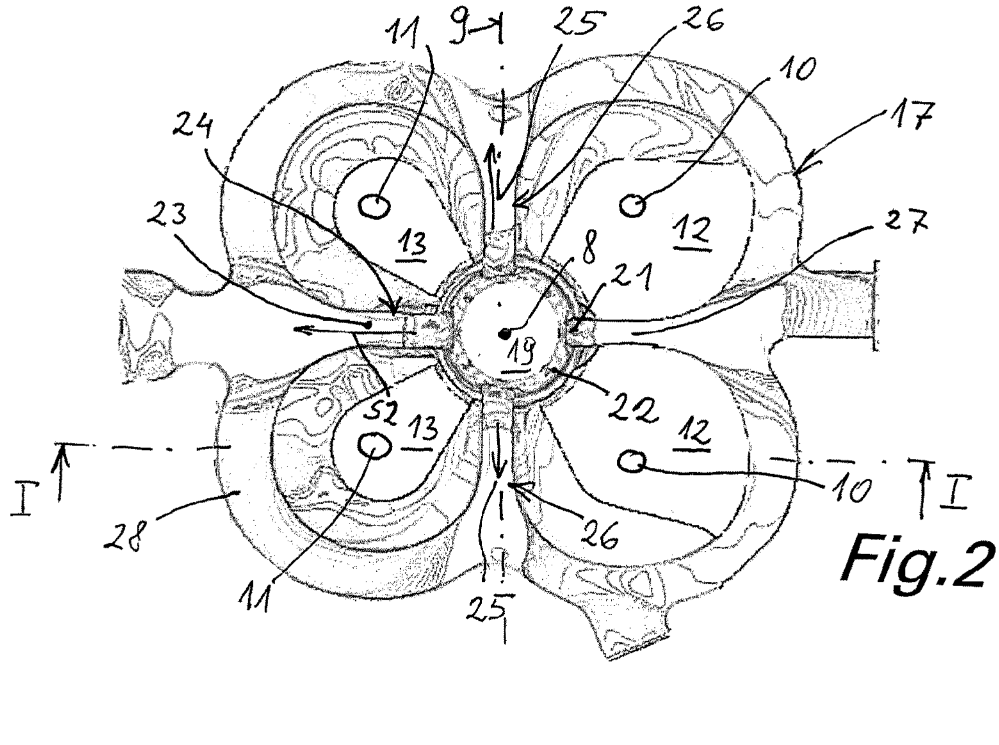
FIG. 2 shows the second head partial cooling chamber in a sectional view according to the line II-II in FIG. 1.

As is usual in cylinder heads 2 with top-down cooling concepts, coolant flows through the cylinder head 2 from the top—i.e. an area remote from the fire deck 4 of the cylinder head 2—to the bottom—i.e. an area close to the fire deck 4. The coolant is thereby supplied to the upper first head partial cooling chamber 16, flows through the first head partial cooling chamber 16 while cooling the exhaust channels 13, and reaches the lower second head partial cooling chamber 17 adjacent to the fire deck 4 via the transfer duct 21 arranged near the cylinder axis 8 in the region of the central component 19, wherein the coolant flows from an inner ring section 22 via a radial channel 23 in the region of the exhaust valve bridge 24 arranged between two exhaust valves, and optionally also via radial channels 25 in the region of the inlet/exhaust valve bridges 26 between inlet and exhaust valves 10, 11 and/or a radial channel 27 between the two inlet valves 10 into the outer ring section 25. FIG. 2 shows the shape of the second head partial cooling chamber 17 in a plan view in the direction of the cylinder axis (the image plane is parallel to the cylinder head sealing plane 5), with the location of the inlet valves 10 and outlet valves 11 being indicated. Optimum cooling around the exhaust valve seats is achieved by the flow from the inner ring section 22 via the radial channels 23, 25, 27 to the outer ring section 28 of the second head partial cooling chamber 17.

The cylinder block 3 has an upper first block partial cooling jacket 29 and a lower second block partial cooling jacket 30 around the cylinder liner 31, which can be dry or wet. The first block partial cooling jacket 29 is arranged between the second block partial cooling jacket 30 and the cylinder head sealing plane 5. In their arrangement on the cylinder liner 31, the first block partial cooling jacket 29 and the second block partial cooling jacket 30 are separated from each other. In other words, a first block partial cooling jacket 29 and second block partial cooling jacket 30 are provided on the cylinder liner 31, separated from each other along the cylinder liner 31, with the second block partial cooling jacket 30 being arranged on a side of the first block partial cooling jacket 29 facing away from the fire deck 4. Furthermore, a main feed channel 32 and a main discharge channel 33 for coolant are integrated in the cylinder block 3 on the exhaust side 7, with the main feed channel 32 being arranged between the main discharge channel 33 and the cylinder head sealing plane 5.

In the exemplary embodiment shown in FIG. 1, the cylinder liner 31 is of wet design, with two separate annular spaces 29*a*, 30*a* being formed between the cylinder liner 31 and the cylinder block 3, which form the first and second block partial cooling chambers 29, 30. In this regard, the cylinder liner 31 has a collar 31*a* with sealing rings 40, which fit tightly against a mating surface of the cylinder block 3 and thus form a fluid-tight separation region 42 between the first block partial cooling jacket 29 and the second block partial cooling jacket 30.

The main feed channel 32 is flow-connected to the first head partial cooling chamber 16 via a first flow transfer 34 in the fire deck 4 of the cylinder head 2 and a supply channel 35. The second head partial cooling chamber 17 is connected to the first block partial cooling jacket 29 via a second flow transfer 36 in the fire deck 4. The second block partial cooling jacket 30 is connected to the main discharge channel 33. The first block partial cooling jacket 29 is connected to the second block partial cooling jacket 30 via a third flow transfer 36. The third flow transfer 37 extends offset from the cylinder liner 31 in the cylinder block 3.

The first flow transfer 34, the second flow transfer 36, the main feed channel 32 and the main discharge channel 33 are arranged on the exhaust side 7, the third flow transfer 37 is arranged essentially diametrically to the second flow transfer 36—with respect to the cylinder axis 8.

The liquid coolant is supplied to the internal combustion engine 1 via the main feed channel 31 in the cylinder block 3 on the exhaust side 7 of the internal combustion engine 1. From this main feed channel 32, the coolant is fed via the first flow transfer 34 and the supply channel 35, which is formed parallel to the cylinder axis 8 for example, into the upper first head coolant chamber 16, flowing around the exhaust channels 13 and cooling them in the process. The coolant is then guided via at least the, for example, annular transfer duct 21 in the region of the central component 19 into the inner ring section 22 of the lower second head partial cooling chamber 17 and from this via at least one radial channel 23 in the region of the exhaust valve bridge 24 between two exhaust valves 11 and/or in the region of at least one exhaust/inlet valve bridge 26 between an exhaust valve 11 and an inlet valve 10 into the outer ring section 28 in the region of the cylinder edge 38 of the cylinder 39. From the outer ring section 28, the coolant is guided via the second flow transfer 36 arranged on the exhaust side 7 into the upper first block partial cooling jacket 29 of the cylinder block 3, which surrounds the cylinder liner 31 in a jacket-like manner, and is guided from the exhaust side 7 to the inlet side 6 while flowing around the upper region of the cylinder liner 31 adjacent to the cylinder head sealing plane 5. Via the third flow transfer 37 arranged on the inlet side 6 between the first block partial cooling jacket 29 and the second block partial cooling jacket 30, the coolant is guided into the lower second block partial cooling jacket 30 surrounding the cylinder liner 31 in a jacket-like manner and, flowing around the lower region of the cylinder liner 31, is guided to the main discharge channel 33 arranged on the exhaust side 7 of the cylinder block 3, from which the coolant is discharged from the internal combustion engine 1 and fed, for example, to a coolant radiator not shown further. The first block partial cooling jacket 29 and the second block partial cooling jacket 30 are flowed through in succession (serially). The third flow transfer 37 can be formed, for example, by an overflow channel arranged in the cylinder block 3.

Thus, between the inflow into the upper first head partial cooling chamber 16 and the outflow through the main discharge channel 33, the coolant is guided through the head partial cooling chamber 16 and the block cooling jacket 41 in at least several—for example four—passes S1, S2, S3, S4 extending transversely to the longitudinal engine plane 9, at least the two passes S3, S4 in the cylinder block 3 intersecting the longitudinal engine plane 9. A pass here denotes a substantially continuous heat transfer surface between two 180° detours of the flow path through the head 15 and block cooling chambers 41.

In this way, efficient cooling of thermally critical areas is achieved in both the cylinder head 2 and the cylinder block 3.

The invention claimed is:

1. A liquid-cooled internal combustion engine, having an inlet side and an exhaust side which are arranged on different sides of a longitudinal engine plane defined by a cylinder axis and a crankshaft axis, having a cylinder head with a top-down cooling concept with a fire deck adjoining a cylinder block and a head cooling chamber with a first head partial cooling chamber spaced from the fire deck and a second head partial cooling chamber which adjoins the fire deck of the cylinder head and is separated from the first head partial cooling chamber by an intermediate deck, wherein the first head partial cooling chamber and the second head partial cooling chamber are flow-connected to one another at least in the region of a central component by means of at least one transfer duct in the intermediate deck, having a main feed channel which is arranged in the cylinder block and is connected to the first head partial cooling chamber via a first flow transfer in the fire deck of the cylinder head and a supply channel, having at least one block cooling jacket which is flow-connected to the second head partial cooling chamber via at least one second flow transfer in the fire deck of the cylinder head and at least partially surrounds a cylinder liner, wherein the block cooling jacket has a first block partial cooling jacket which faces the fire deck and into which the second flow transfer opens, and a second block partial cooling jacket separated from the first block partial cooling jacket and arranged on a side of the first block partial cooling jacket facing away from the fire deck, wherein the first block cooling jacket is flow-connected to the second block cooling jacket by means of at least one third flow transfer arranged diametrically to the second flow transfer with respect to the cylinder axis, and wherein the second block partial cooling jacket is connected to a main discharge channel arranged in the cylinder block, wherein the first block partial cooling jacket and the second block partial cooling jacket are configured to be flowed through in succession serially.

2. The internal combustion engine according to claim 1, wherein the third flow transfer and the second flow transfer are arranged on different sides of the longitudinal engine plane.

3. The internal combustion engine according to claim 1, wherein the first flow transfer is arranged—in relation to the longitudinal engine plane—on the same side as the main feed channel.

4. The internal combustion engine according to claim 1, wherein the first flow transfer—in relation to the longitudinal engine plane—is arranged on the same side as the second flow transfer.

5. The internal combustion engine according to claim 1, wherein the main feed channel is arranged between the main discharge channel and a cylinder head sealing plane.

6. The internal combustion engine according to claim 1, wherein the two block partial cooling chambers—with respect to the cylinder axis—are arranged one above the other, wherein the first block partial cooling jacket is arranged between the second block partial cooling jacket and a cylinder head sealing plane.

7. The internal combustion engine according to claim 1, wherein the third flow transfer is arranged on the inlet side.

8. The internal combustion engine according to claim 1, wherein the main discharge channel is arranged adjacent to the main feed channel on the exhaust side in the cylinder block.

9. The internal combustion engine according to claim 1, wherein the first flow transfer and the second flow transfer are arranged on the exhaust side.

10. The internal combustion engine according to claim 1, wherein the second head partial cooling chamber has an inner ring section around the central component and an outer ring section—as viewed from a direction of the cylinder axis—in the region of the cylinder liner, wherein the inner ring section and the outer ring section are flow-connected to one another via at least one radial channel in a region selected from the group consisting of at least one exhaust valve bridge and at least one inlet/exhaust valve bridge.

11. The internal combustion engine according to claim 1, wherein at least one transfer duct in the intermediate deck is of an annular design.

12. The internal combustion engine according to claim 1, wherein the cylinder head is designed as a single cylinder head.

13. The internal combustion engine according to claim 1, wherein the internal combustion engine is designed to be self-igniting or spark-igniting.

14. A method for cooling an internal combustion engine according to claim 1, wherein the coolant is supplied to a main feed channel in the cylinder block on the exhaust side of the internal combustion engine, is guided therefrom via a first flow transfer and a supply channel into the first head partial cooling chamber, flowing around the exhaust channels and cooling these in the process, and is then guided via at least one transfer duct in the region of a central component into the inner ring section of the second head partial cooling chamber, is guided therefrom via at least one radial channel in the region of an exhaust valve bridge and/or an exhaust/inlet valve bridge into an outer ring section, is guided therefrom via at least one second flow transfer arranged on the exhaust side into the first block partial cooling jacket, the coolant is guided from the exhaust side to the inlet side while flowing around an upper region of the cylinder liner facing the fire deck, is guided into the second block partial cooling jacket via a third flow transfer on the inlet side and, while flowing around a lower region of the cylinder liner facing away from the fire deck, is guided to a main discharge channel arranged on the exhaust side of the cylinder block, wherein the first block partial cooling jacket and the second block partial cooling jacket are flowed through in succession serially.

15. The method according to claim 14, wherein the coolant is guided through the head cooling chamber and the block cooling jacket between the inflow into the first head partial cooling chamber and the outflow through the main discharge channel in at least four passes extending transversely to the longitudinal engine.

16. The internal combustion engine according to claim 3, wherein the first flow transfer is arranged on the exhaust side.

17. The internal combustion engine according to claim 4, wherein the first flow transfer is arranged on the exhaust side.

18. The internal combustion engine according to claim 1, wherein the first flow transfer or the second flow transfer is arranged on the exhaust side.

19. The internal combustion engine according to claim 11, wherein the transfer duct in the intermediate deck annularly surrounds the central component.

20. The internal combustion engine according to claim 13, wherein the internal combustion engine is designed to be with an active or passive pre-chamber.

21. The internal combustion engine according to claim 1, wherein the liquid-cooled internal combustion engine is a large engine.

22. Method according to claim 15, wherein at least two passes intersect the longitudinal engine plane.

23. Method according to claim 22, wherein said at least two passes are arranged in the cylinder block.

* * * * *